United States Patent Office 3,053,861
Patented Sept. 11, 1962

3,053,861
3α-AMINO-PREGNANE COMPOUNDS
Willem Jacob van der Burg, Oss, Netherlands, assignor to Organon Inc., West Orange, N.J., a corporation of New Jersey
No Drawing. Filed Feb. 2, 1962, Ser. No. 170,826
Claims priority, application Netherlands Feb. 17, 1961
3 Claims. (Cl. 260—397.3)

The invention relates to a process for the protection of the amino group of 3α-amino-20-keto-5α-pregnane and/or 3α-amino-20-hydroxy-5α-pregnane.

In C.R. Acad. Sci., vol. 246, page 3076 (1958) M. M. Janot et al. describe the isolation of the alkaloids funtumine and funtumidine from the leaves of *Funtumia latifolia*. The structure of these alkaloids provided to be that of the 3α-amino-20-keto-5α-pregnane and the 3α-amino-20α-hydroxy-5α-pregnane respectively.

These steroid compounds have proved to be important starting products for the preparation of all kinds of biologically active steroids of the pregnane, androstane and oestrane series.

For the direct conversion of the funtumine into an androstane compound M. M. Janot et al. have elaborated a method according to an article in Bull. Soc. Chim. France, page 1640 (1960), by which the funtumine is converted into the corresponding 17β-acetoxy-5α-androstane compound by oxidation with perbenzoic acid or trifluoroperacetic acid. As in this oxidation the 3-amino group is affected, it must previously be protected. Janot et al. have performed this protection by reacting the amino group with acetic acid anhydride or with trifluoro acetic acid anhydride.

It has appeared that the use of these protecting groups entails some important disadvantages. The protection of the funtumine by conversion into the 3-acetamide has the great disadvantage that after oxidation of the pregnane side-chain or any other conversion the N-acetyl group is very difficult to split off. This splitting off requires a treatment with an ethanolic solution of potassium hydroxide under high pressure and at a temperature of at least 180° C. This cumbersome method does not only cause losses in the yield but is also entirely unsuitable for carrying out on a manufacturing scale.

The trifluoroacetyl group on the other hand can be split off again very easily, but the trifluoroacetic acid anhydride to be used for the introduction of this group is so expensive that it does not make the preparation of steroids from funtumine remunerative.

To obtain a profitable synthesis of steroids, starting from funtumine, it is therefore of great importance to have the disposal of cheap reagents which can be easily coupled to the 3-amino group and can also be easily split off again.

Surprisingly it was found now that these requirements are met by employing a halogen formic acid ester of the formula:

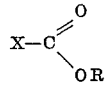

in which
X=halogen and
R=hydrocarbon radical.

The hydrocarbon radical may be a lower aliphatic, aromatic or araliphatic hydrocarbon radical. As examples of halogen formic acid esters to be used are mentioned the methyl, ethyl, sec. butyl and benzyl esters of chloro or bromo formic acid.

Protection of the 3-amino group according to the process of the invention may also be of importance with funtumidine or with a mixture of funtumine and funtumidine.

For example, in the oxidation of the funtumidine to the corresponding 20-keto compound there is a chance that the 3-amino group is affected. If the funtumidine to be oxidized is mixed with funtumine, which is the case in the extraction of *Funtumia latifolia*, the two compounds need not previously be isolated separately, but the mixture can be treated with an oxidant after protection of the 3-amino group according to the process of the invention, after which the funtumine protected in 3-position is isolated.

The introduction of the protecting group can be carried out in a simple manner by leaving the funtumine and/or funtumidine to stand for some time at room temperature in the presence of a halo formic acid ester after which the funtumine and/or funtumidine protected at the nitrogen is obtained in practically quantitative yield. After carrying out the desired conversion the protected group can be split off again by means of an acid or base in a very simple manner, for example, by boiling with a 4 N solution of potassium hydroxide in methanol. The splitting off of the present protecting group, too, is practically quantitative.

The invention is illustrated by the following examples.

*Example I*

(a) 31.7 g. (0.1 mol) of funtumine are dissolved in 200 ml. of chloroform. While stirring and cooling in water 15.2 g. (0.14 mol) of chloro formic acid ethyl ester are added. After stirring for 3 minutes 70 ml. of 2 N NaOH in water are added, whereupon the mixture is stirred very vigorously for 5 minutes. The water layer is drained off and the chloroform layer washed with water until free from alkali, dried on anhydrous Na₂SO₄ and evaporated to dryness. Next 100 ml. of methanol are added, whereupon the mixture is evaporated to dryness again to obtain 38.8 g. of N-carbo-ethoxy-funtumine=99.8% of the theory. The substance has a double melting point, viz.: 65–70° C.→solid →123–7° C.

The product is sufficiently pure for further conversion. By recrystallisation from methanol a product is obtained, the second melting point of which is 127–9° C.

(b) The thus obtained product, 38.8 g. of N-carbo-ethoxy-funtumine, is passed into a solution of trifluoro-peracetic acid, prepared from 24.6 ml. of trifluoroacetic acid anhydride and 4.2 ml. of 85% hydrogen peroxide in 240 ml. of methylchloride (method of Janot, Khuong-Huu and Goutarel, Bull. Soc. Chim. France (1960), page 1642). Further the mixture is stirred a whole night (i.e. 15 hours). Next the liquid is washed with a solution of 5% sodiumcarbonate, dried on hydrous sodium-sulphate and evaporated to dryness to obtain the crude 3α - carbo - ethoxy-amino-17β-acetoxy-(5α)-androstane. By recrystallising the product once from a small quantity of 96% alcohol, 24.5 g. of crystalline compound are obtained. Melting point 168–172° C.=60.5% of the theory.

(c) The crystalline 3α-carbo-ethoxy-amino-17β-acetoxy-(5α)-androstane (24.5 g.) obtained above is passed into 160 ml. of 4 N KOH in 90% methanol and refluxed for 10 hours. By evaporation the greater part of the methanol is removed, whereupon the remaining reaction mixture is slowly diluted with 2 volumes of water. After standing for ½ hour the mixture is sucked off and washed with water until neutral to obtain 17.4 g. of 3α-amino-17β-hydroxy-(5α)-androstane. Melting point 172–4° C.=99% of the theory.

In accordance with the process described above the funtumine is converted into the corresponding carboalkoxy-amino and carbo-benzyloxy-amino derivatives by means of bromo formic acid methyl ester, the chloro formic acid sec. butyl ester and the chloro formic acid benzyl ester, which after oxidation with a peracid and subsequent saponification with an alkali metal hydroxide is converted into the 3α-amino-17β-hydroxy-(5α)-androstane with the melting point of 172–174° C.

In the same way funtumine and funtumidine have been converted into the corresponding N-carboxy ester-derivatives by reaction with bromo formic acid propyl ester, chloro formic acid pentyl ester and bromo formic acid hexyl ester.

*Example II*

31.7 g. of a mixture of funtumine (85%) and funtumidine (15%) are dissolved in 200 ml. of methyl chloride. After that 15 g. of chloro formic acid ester and 50 g. of ice are added simultaneously. After stirring vigorously for 5 minutes 35 ml. of 4 N NaOH are added and stirring is continued for 5 minutes. The methyl chloride layer is drained off and shaken or stirred vigorously for 3 hours with a mixture of 8 g. of chromic acid anhydride, 50 ml. of water and 8 ml. of acetic acid. The methyl chloride layer is separated, washed with water, a $NaHCO_3$-solution and again with water, dried on anhydrous sodium sulphate and evaporated to obtain 38.6 g. of N-acrbo-ethoxy-funtumine (=99.3% of the theory) with a melting point of 64–69° C.→solid→123–6° C.

*Example III*

In accordance with the processes described in the above examples the funtumidine is converted into the carboethoxy-funtumidine by means of chloro formic acid ethyl ester, which after oxidation of the 20α-hydroxyl group is converted into the N-carbo-ethoxy-funtumine in accordance with the process described in Example II. Melting points 64–68° C. and 124–127° C.

According to the methods of the previous examples funtumine and funtumidine have been converted into the N-carbo-ethoxy-, and N-carbo-isopentyl-derivatives by reaction with bromo formic acid ethyl ester and chloro formic acid isopentyl ester.

*Example IV*

31.7 g. (0.1 mol of funtumine) are dissolved in 200 ml. of methyl chloride. In a period of 5 minutes 17 g. of chloro formic acid sec. butyl ester are added while cooling the reaction mixture in ice. When the whole quantity has been added the ice-bath is removed, whereupon a solution of 6 g. of NaOH in 50 ml. of water is added dropwise while stirring continuously. Finally the mixture is stirred for another 5 minutes. The methyl chloride layer is drained off and washed, dried and evaporated in the manner of Example I.

The N-carbo-sec.-butyloxy-funtumine obtained crystallises spontaneously after the addition of ether. Yield: 41.5 g.=99.6% of the theory. Melting point 161–164° C.

I claim:
1. Process for the preparation of compounds of the formula:

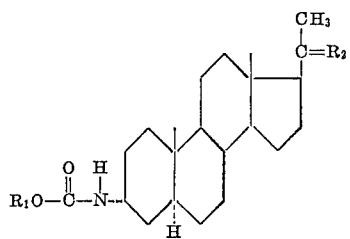

in which $R_1$=a radical selected from the group consisting of a lower aliphatic and an araliphatic hydrocarbon radical, and $R_2$=selected from the group consisting of H(αOH) and O, comprising reacting the corresponding 3α-amino compound with a halogen formic acid ester of the formula:

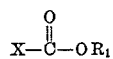

in which

X=a halogen atom, and $R_1$=a radical selected from the group consisting of a lower aliphatic and an araliphatic hydrocarbon radical 2. Process according to claim 1, characterized in that the 3α-amino-compound is reacted with a hydrocarbon ester of chloro formic acid in the presence of an organic solvent.

3. New steroid-derivatives of the general formula:

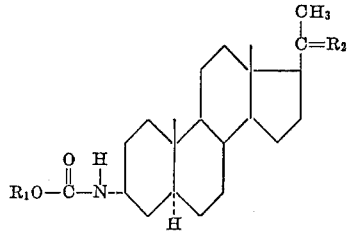

in which $R_1$=a radical selected from the group consisting of a lower aliphatic and an araliphatic hydrocarbon radical, and $R_2$=selected from the group consisting of H(αOH) and O.

No references cited.